(12) United States Patent
Tseng

(10) Patent No.: US 7,815,206 B2
(45) Date of Patent: Oct. 19, 2010

(54) SECURING DEVICE FOR A BICYCLE FRONT FORK

(76) Inventor: Peng-Yu Tseng, 4F, No. 544, Minzu E. Rd., Taipei (TW)

( * ) Notice: Subject to any disclaimer, the term of this patent is extended or adjusted under 35 U.S.C. 154(b) by 0 days.

(21) Appl. No.: 12/130,466

(22) Filed: May 30, 2008

(65) Prior Publication Data

US 2009/0295121 A1 Dec. 3, 2009

(51) Int. Cl.
B62K 21/16 (2006.01)
(52) U.S. Cl. .................. 280/279; 74/551.1
(58) Field of Classification Search .......... 280/279, 280/276; 74/551.1; 403/370, 371; 384/540, 384/517
See application file for complete search history.

(56) References Cited

U.S. PATENT DOCUMENTS 2,542,967 A * 2/1951 Waechter ............ 248/188.5
4,020,735 A * 5/1977 Herback ............... 411/26
5,419,650 A * 5/1995 Hoshino ............... 403/370
5,536,104 A * 7/1996 Chen .................. 403/370
5,605,075 A * 2/1997 Chi .................... 74/551.1

* cited by examiner

Primary Examiner—Anne Marie M Boehler
(74) Attorney, Agent, or Firm—patenttm.us

(57) ABSTRACT

A securing device for a bicycle front fork has a clamping sleeve, an upper pressing base and a lower pressing base. The clamping sleeve is hollow, is made of a resilient material and has a C-shaped cross section. The upper pressing base is attached to a top end of the clamping sleeve and has a threaded hole and an upper pressing surface. The threaded hole is defined in the upper pressing base to screw with a connecting bolt. The upper pressing surface is conical and pressing against the inner surface of the clamping sleeve. The lower pressing base is attached to a bottom end of the clamping sleeve, is connected to the upper pressing base in a thread manner and has a lower pressing surface. The lower pressing surface is conical and presses against the inner surface the clamping sleeve.

4 Claims, 4 Drawing Sheets

SECURING DEVICE FOR A BICYCLE FRONT FORK

BACKGROUND OF THE INVENTION

1. Field of the Invention

The present invention relates to a securing device, and more particularly to a securing device that can fit with different bicycle front forks in different dimensions.

2. Description of Related Art

With reference to FIGS. 4 and 5, a conventional securing device (40) for holding a bicycle front fork (70) on a bicycle frame, such as a head tube (80) comprises a clamping sleeve (42), an upper pressing base (44), a lower pressing base (46) and a connecting tube (48). The clamping sleeve (42) is hollow and has a C-shaped cross section. The upper and lower pressing bases (44,46) are attached respectively to two ends of the clamping sleeve (42) and abut and press against the inner surface of the clamping sleeve (42).

The upper pressing base (44) has a through hole and an upper pressing surface (442) being conical and pressing against the inner surface at the top end of the clamping sleeve (42). The lower pressing base (46) has a threaded hole (464) and a lower pressing surface (462) being conical and pressing against the inner surface at the bottom end of the clamping sleeve (42). The threaded hole (464) is defined in the lower pressing base (46). The connecting tube (48) extends through the through hole in the upper pressing base (44) and the clamping sleeve (42) and has an outer thread engaging and screwed into the threaded hole (464) in the lower pressing base (46). The connecting tube (48) has a threaded hole (482) defined in the top of the connecting tube (48).

To connect the front fork (70) with the head tube (80) with the securing device (40), the securing device (40) is put into the front fork (70) via the top opening of the front fork (70), and the upper pressing base (44) abuts against the top of the front fork (70). The connecting tube (48) is then rotated, and the lower pressing base (46) is moved close to the upper pressing base (44), and the clamping sleeve (42) will be expanded by the conical pressing surfaces (442,462) to press against the inner surface of the front fork (70).

A pressing bolt (50) extends through a cap (52) and is screwed into the threaded hole (482) in the connecting tube (48), wherein the cap (52) abuts against the top of the head tube (80). Accordingly, the front fork (70) is securely but rotatably connected with the head tube (80) with the securing device (40).

However, because the clamping sleeve (42) of the conventional securing device (40) is metal, the expansion level of the clamping sleeve (42) is limited such that the clamping sleeve (42) cannot be applied for different head tubes with different sizes.

Additionally, the pressing surfaces (442,462) on the pressing bases (44,46) have a same obliquity and only lower pressing base (46) moves during the combination process, so a long travel of the lower pressing base (46) is needed for expanding the clamping sleeve (42) to a desired level. Consequently, the length of the clamping sleeve (42) has to be large enough for a long travel of the lower pressing base (46), and the volume of the convention securing device (40) is large.

To overcome the shortcomings, the present invention tends to provide a securing device to mitigate or obviate the aforementioned problems.

SUMMARY OF THE INVENTION

The main objective of the invention is to provide a securing device that can fit with different bicycle front forks in different dimensions and is versatile in use.

The securing device has a clamping sleeve, an upper pressing base and a lower pressing base. The clamping sleeve is hollow, is made of a resilient material and has a top end, a bottom end, an inner surface and a slit. The slit is defined through the clamping sleeve from the top end to the bottom end to make the clamping sleeve having a C-shaped cross section. The upper pressing base is attached to the top end of the clamping sleeve and has a top, a threaded hole and an upper pressing surface. The threaded hole is defined in the upper pressing base to be adapted to screw with a connecting bolt for combining the bicycle front fork with a bicycle frame. The upper pressing surface is conical and pressing against the inner surface at the top end of the clamping sleeve. The lower pressing base is attached to the bottom end of the clamping sleeve, is connected to the upper pressing base in a thread manner and has a lower pressing surface. The lower pressing surface is conical and presses against the inner surface at the bottom end of the clamping sleeve.

Other objects, advantages and novel features of the invention will become more apparent from the following detailed description when taken in conjunction with the accompanying drawings.

DETAILED DESCRIPTION OF PREFERRED EMBODIMENT

Figure 1:
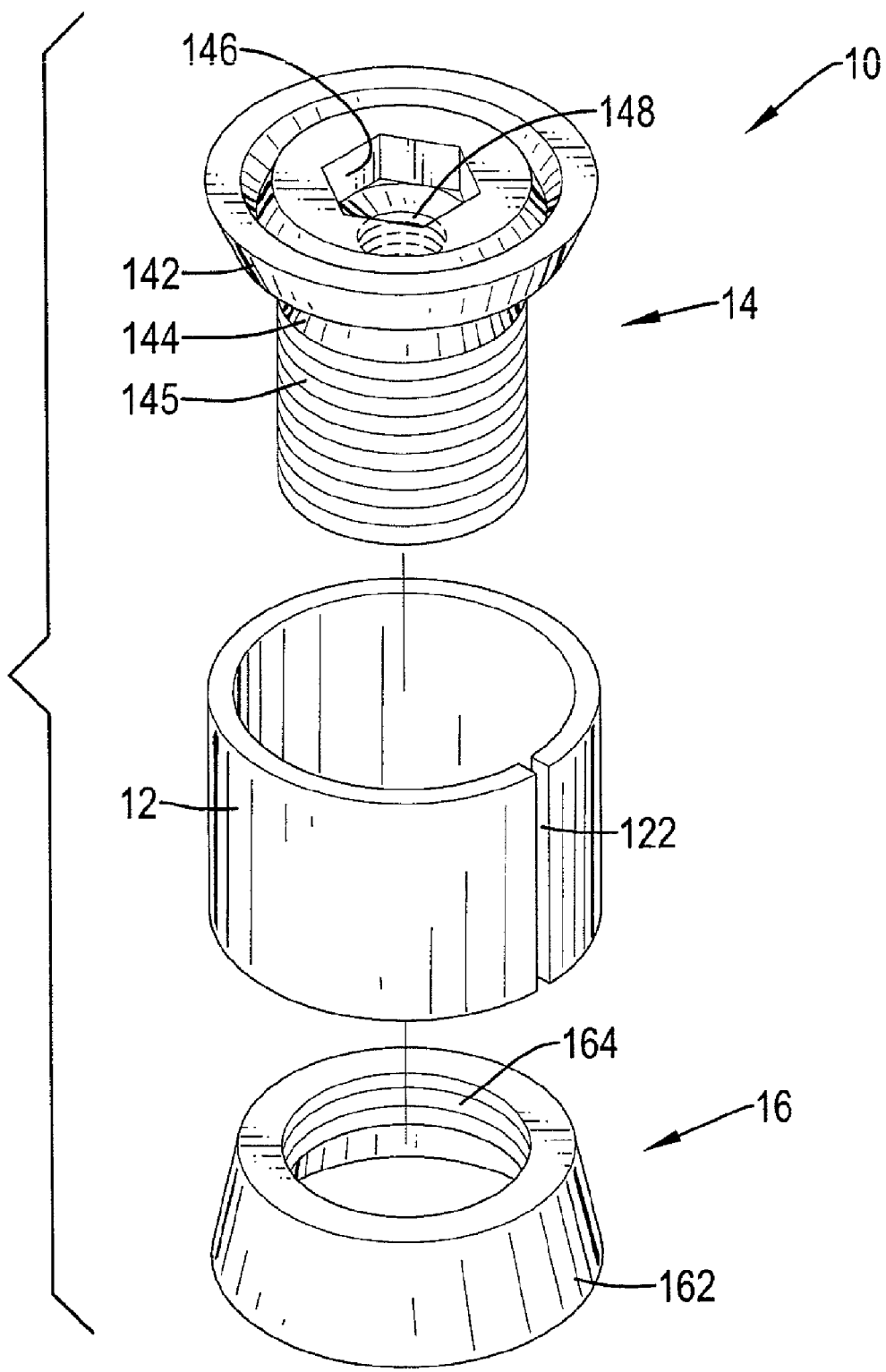
FIG. 1 is an exploded perspective view of a securing device for a bicycle front fork in accordance with the present invention.
Figure 2:
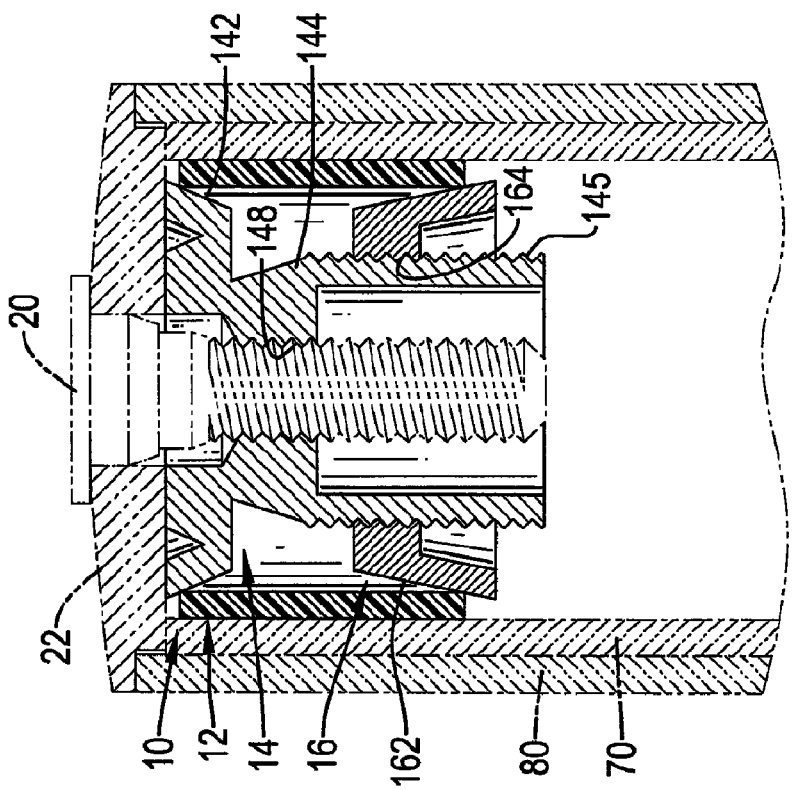
FIG. 2 is a cross sectional side view of the securing device in FIG. 1 mounted in a front fork of a bicycle.
Figure 3:
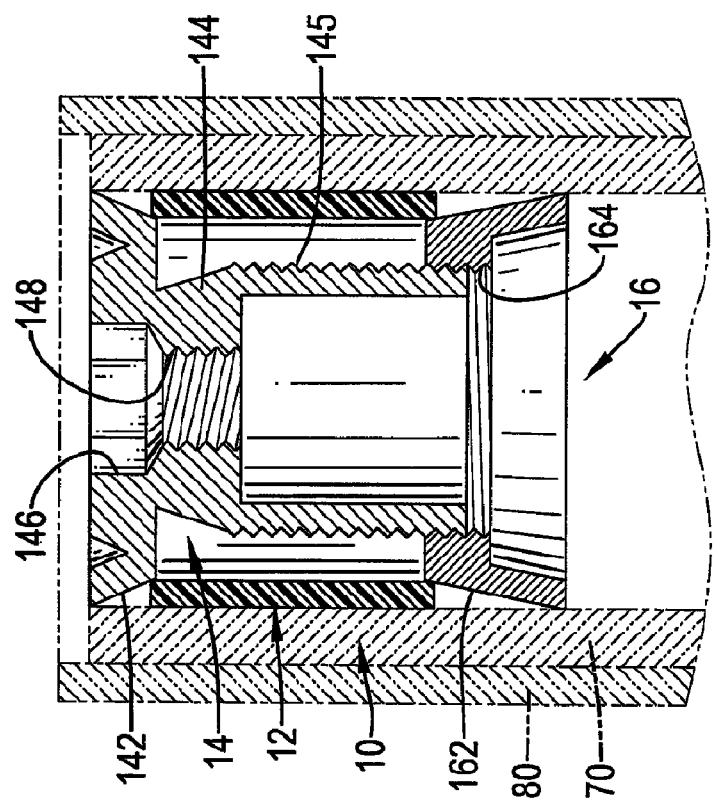
FIG. 3 is an operational side view in partial section of the securing device in FIG. 1 for combining the front fork with a head tube.
Figure 4:
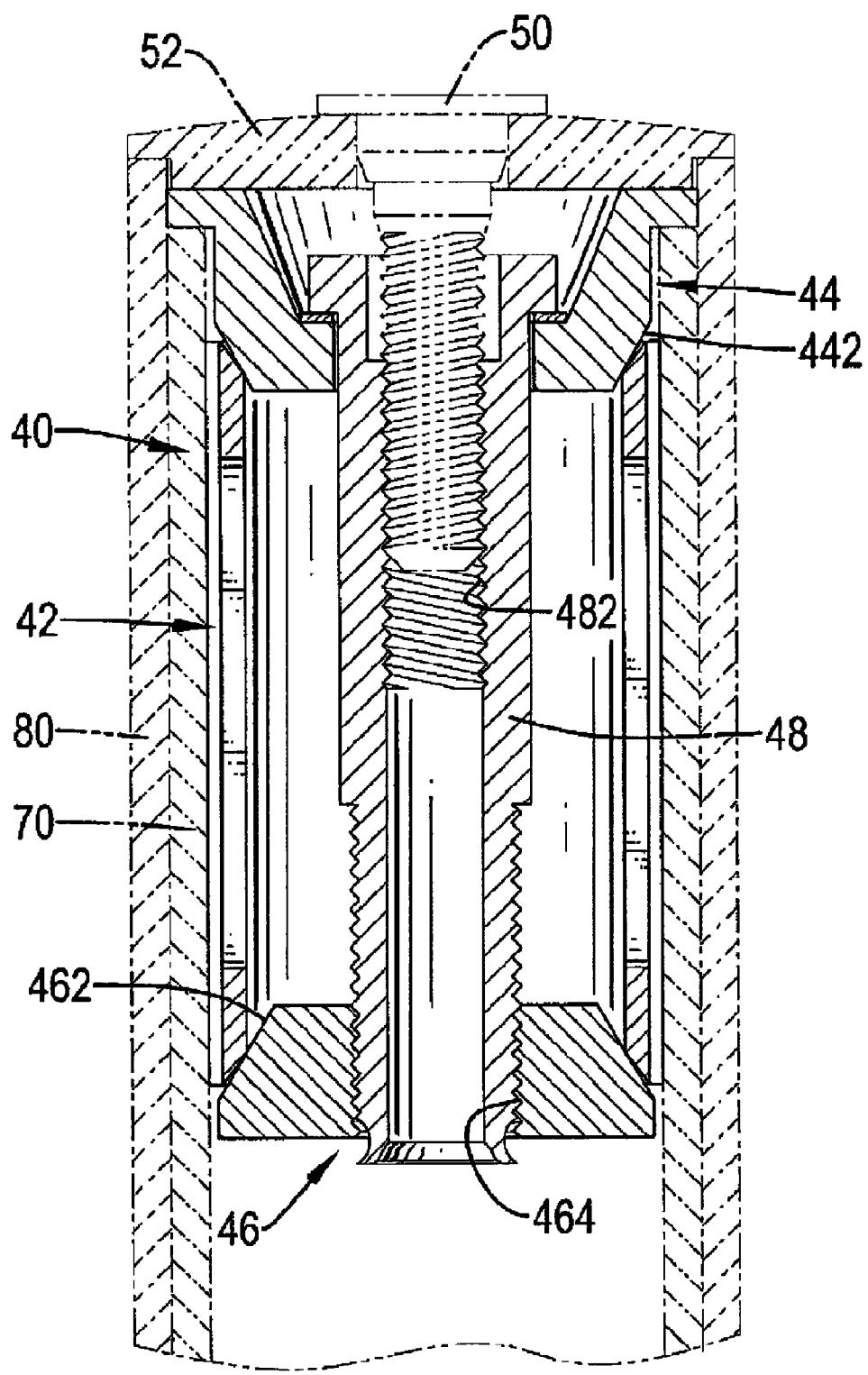
FIG. 4 is a side view in partial section of a conventional securing device in accordance with the prior art for combining a front fork with a head tube of a bicycle.
Figure 5:
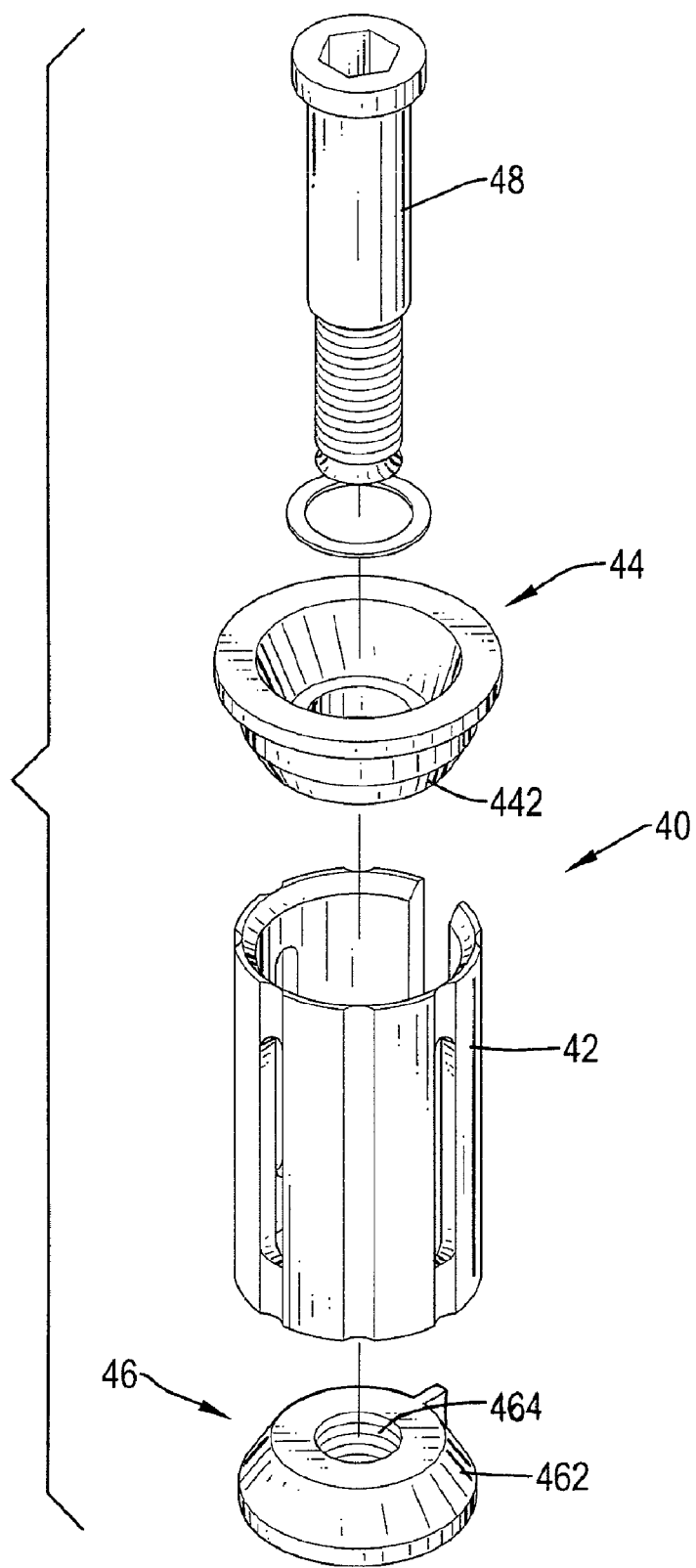
FIG. 5 is an exploded perspective view of the securing device in FIG. 4.

With reference to FIGS. 1 to 3, a securing device (10) for a bicycle front fork (70) in accordance with the present invention comprises a clamping sleeve (12), an upper pressing base (14) and a lower pressing base (16). The clamping sleeve (12) is hollow, is made of a resilient material such as rubber, plastic, carbon fiber or the like that is non-metal. The clamping sleeve (12) has a top end, a bottom end, an inner surface and a slit (122). The slit (122) is defined through the clamping sleeve (12) from the top end to the bottom end to make the clamping sleeve (12) having a C-shaped cross section. The slit (122) has two side edges parallel with or inclined relative to each other.

The upper pressing base (14) is attached to the top end of the clamping sleeve (12) and has a top, a threaded hole (148), an upper pressing surface (142), a connecting tube (144) and a tool hole (146). The threaded hole (148) is defined in the upper pressing base (14) to screw with a connecting bolt (20) for combining the bicycle front fork (70) with a bicycle frame, such as a head tube (80). The upper pressing surface (142) is conical and presses against the inner surface at the top end of the clamping sleeve (12). The connecting tube (144) is integrally formed on and protrudes from the bottom of the upper pressing base (14) as a single part and has an outer thread (145). The tool hole (146) is non-circular, is defined in the top of the upper pressing base (14) and communicates with the threaded hole (148) in the upper pressing base (14).

The lower pressing base (16) is attached to the bottom end of the clamping sleeve (12) and is connected to the upper pressing base (14) in a thread manner. The lower pressing base (16) has a lower pressing surface (162) and a threaded hole (164). The lower pressing surface (162) is conical and presses against the inner surface at the bottom end of the clamping sleeve (12). In a preferred embodiment, the upper pressing surface (142) has an obliquity different from that of the lower pressing surface (162). The threaded hole (164) is defined in the lower pressing base (16) and engages and is screwed with the outer thread (145) on the connecting tube (144). With the engagement of the threaded hole (164) and the outer thread (145), the lower pressing base (16) is connected with the upper pressing base (14) in a thread manner.

To combine a front fork (70) with a head tube (80) by the securing device (10), the securing device (10) is put into the front fork (70) via the top opening of the front fork (70). The upper pressing base (14) is then rotated with a tool engaging the tool hole (146) or by hands of a user directly. With the engagement of the threaded hole (164) in the lower pressing base (16) and the outer thread (145) on the upper pressing base (14), the pressing bases (14,16) will move simultaneously toward each other while the upper pressing base (14) being rotated. Consequently, the C-shaped clamping sleeve (12) will be expanded by the conical pressing surfaces (142, 162) on the pressing bases (14,16) to make the clamping sleeve (12) securely abutting against the inner surface of the front fork (70). Finally, a connecting bolt (20) extends through a cap (22) that abuts against top ends of the front fork (70) and the head tube (80) and is screwed into the threaded hole (148) in the upper pressing base (14). Accordingly, the front fork (70) is securely but rotatably connected with the head tube (80) by the securing device (10).

With such as an arrangement, the structure of the securing device (10) can be simplified. Because the clamping sleeve (12) is made of a resilient material, the expansion level of the clamping sleeve (12) is enlarged and the securing device (10) in accordance with the present invention can be applied to different front fork with different sizes and is versatile in use.

In addition, with different obliquities of the pressing surfaces (142,162) on the pressing bases (14,16) additional to the simultaneous movement of the pressing bases (14,16), the travel of the pressing bases (14,16) for expanding the clamping sleeve (12) to a desired level can be shortened. Accordingly, the length of the clamping sleeve (12) can be decreased, and the volume of the securing device (10) can be efficiently reduced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A securing device for a bicycle front fork comprising:
    a clamping sleeve being hollow, being made of a non-metal resilient material and having a top end;
    a bottom end;
    an inner surface; and
    a slit defined through the clamping sleeve from the top end to the bottom end to make the clamping sleeve having a C-shaped cross section;
    an upper pressing base attached to the top end of the clamping sleeve and having
    a top;
    a threaded hole defined in the upper pressing base to be adapted to screw with a connecting bolt for combining the bicycle front fork with a bicycle frame; and
    an upper pressing surface being conical and pressing against the inner surface at the top end of the clamping sleeve; and
    a lower pressing base attached to the bottom end of the clamping sleeve, connected to the upper pressing base in a thread manner and having a lower pressing surface being conical and pressing against the inner surface at the bottom end of the clamping sleeve,
    wherein the upper pressing surface has an obliquity different from that of the lower pressing surface;
    the upper pressing base further has a connecting tube integrally formed on and protruding from the bottom of the upper pressing base as a single part and having an outer thread; and
    the lower pressing base further has a threaded hole engaging the outer thread on the connecting tube.

2. The securing device as claimed in claim 1, wherein the slit has two side edges parallel with each other.

3. The securing device as claimed in claim 2, wherein the upper pressing base further comprises a non-circular tool hole defined in the top of the upper pressing base and communicating with the threaded hole in the upper pressing base.

4. The securing device as claimed in claim 1, wherein the upper pressing base further comprises a non-circular tool hole defined in the top of the upper pressing base and communicating with the threaded hole in the upper pressing base.

* * * * *